United States Patent [19]

Sulzer

[11] 4,346,728

[45] Aug. 31, 1982

[54] AUTOMATED DUAL MODE VALVE ACTUATOR

[75] Inventor: Harry E. Sulzer, Telford, Pa.

[73] Assignee: Anchor/Darling Industries, Inc., Bala Cynwyd, Pa.

[21] Appl. No.: 172,560

[22] Filed: Jul. 28, 1980

[51] Int. Cl.³ .................. F16K 31/53; F16K 29/00
[52] U.S. Cl. .................. 137/243.6; 51/241 VS; 74/25; 74/89.15; 74/424.8 VA; 74/665 B; 74/674; 137/331; 251/134; 251/249.5; 251/267; 251/229; 192/150
[58] Field of Search ............... 51/27, 29, 30, 241 VS; 74/89.15, 424.8 R, 424.8 VA, 625, 626, 674, 675, 665 B, 665 Q, 25; 137/243, 243.1, 243.6, 330, 331; 251/248, 249.5, 229, 264, 267, 133, 134; 192/150

[56] References Cited

U.S. PATENT DOCUMENTS

| | | | |
|---|---|---|---|
| 1,774,831 | 9/1930 | Henin | 74/675 |
| 2,059,366 | 11/1936 | Kinzie | 74/626 |
| 2,884,808 | 5/1959 | Mueller | 74/674 |
| 2,996,075 | 8/1961 | Deimer et al. | 137/243 |
| 3,220,431 | 11/1965 | Morrell | 137/243.6 |
| 3,311,121 | 3/1967 | Morrell | 137/243.6 |
| 3,313,178 | 4/1967 | Saunders | 74/424.8 VA |
| 3,416,308 | 12/1968 | Livezey | 74/675 |
| 3,505,888 | 4/1970 | Denkowski | 74/89.15 |
| 3,524,526 | 8/1970 | Denkowski | 251/134 |
| 3,738,183 | 6/1973 | Ball, Jr. et al. | 74/89.15 |
| 3,949,626 | 4/1976 | Berlinger, Jr. et al. | 74/675 |

FOREIGN PATENT DOCUMENTS 2727293  12/1978  Fed. Rep. of Germany ... 251/249.5

Primary Examiner—George L. Walton
Attorney, Agent, or Firm—Dann, Dorfman, Herrell and Skillman

[57] ABSTRACT

A dual mode valve actuator for automatically controlling the operation of a valve comprises a first reversible drive motor and a first planetary drive assembly which operate to move the valve stem axially during a first mode of operation. The actuator further comprises a second drive motor and a second planetary drive assembly which cooperate with the first planetary drive assembly to rotate the valve stem without axial movement during a second mode of operation. A control means is provided to control the operational mode of the actuator.

10 Claims, 4 Drawing Figures

AUTOMATED DUAL MODE VALVE ACTUATOR

FIELD OF THE INVENTION

This invention relates generally to valve actuators and, more particularly, to a valve actuator which automatically provides for both rotational and axial translational movement of a valve stem.

DESCRIPTION OF THE PRIOR ART

In many applications it is desirable to have the ability to move the stem of a valve in two ways, axially and rotationally. For example, in some industrial applications it is desirable when closing the valve, to first move the valve stem axially so that the valve disc contacts the valve seat and then to rotate the valve stem so the valve disc grinds against the seat to remove any buildup of deposited material which may have otherwise acted to prevent a complete closing of the valve.

One such prior art valve is described in U.S. Pat. No. 2,996,075 to Deimer et al. The Deimer et al patent discloses a valve which may be opened or closed, without rotation of the valve stem, by rotating a threaded yoke bushing surrounding and engaging the valve stem. The rotation of the yoke bushing is accomplished through suitable gearing keyed to the yoke bushing, utilizing either a manual or power wrench. Rotation of the yoke bushing causes the valve stem to move axially (upwardly or downwardly), thereby engaging or disengaging the valve seat and the valve disc. When the valve seat is to be ground, the valve disc is lowered into engagement with the seat and a jam nut is tightened so that the yoke bushing and the valve stem are locked together and rotate in unison. The subsequent rotation of a suitable handle on the yoke bushing (as described above) rotates the valve stem (without axial movement) to grind the valve disc against the valve seat.

The Deimer et al valve operates effectively in some applications, however, in many applications, the excessive physical effort required to accomplish the grinding and proper seating of the valve makes it unsuitable. Additionally, the design of the Deimer et al valve makes automation of the grinding function complex and expensive.

The present invention overcomes the deficiencies of the prior art by providing an automated dual mode valve actuator which provides for both rotational and axial movement of a valve stem.

SUMMARY OF THE INVENTION

Briefly stated, the present invention provides a dual mode valve actuator for controlling the operation of a valve having a valve stem at least partially threaded to provide for both rotational and axial movement of the valve stem. The apparatus comprises a first drive motor which is activated during the first mode of valve actuator operation. A first planetary drive assembly operatively couples the first drive motor to the valve stem. A second drive motor, which is activated during the second mode of actuator operation, is operatively coupled to the first planetary drive assembly and to a second planetary drive assembly. The second planetary drive assembly threadingly engages the valve stem. During the first mode of operation, the valve stem is driven by the first planetary drive assembly to rotate relative to the second drive assembly, thereby moving the valve stem in an axial direction. During the second mode of operation, both planetary drive assemblies are driven to rotate in unison, thereby rotating the valve stem without axial movement thereof. Control means is provided for activating the deactivating the two motors.

BRIEF DESCRIPTION OF THE DRAWINGS

The foregoing summary as well as the following detailed description of a preferred embodiment of the present invention will be better understood when read in conjunction with the accompanying drawings, in which.

DESCRIPTION OF A PREFERRED EMBODIMENT

Figure 1:
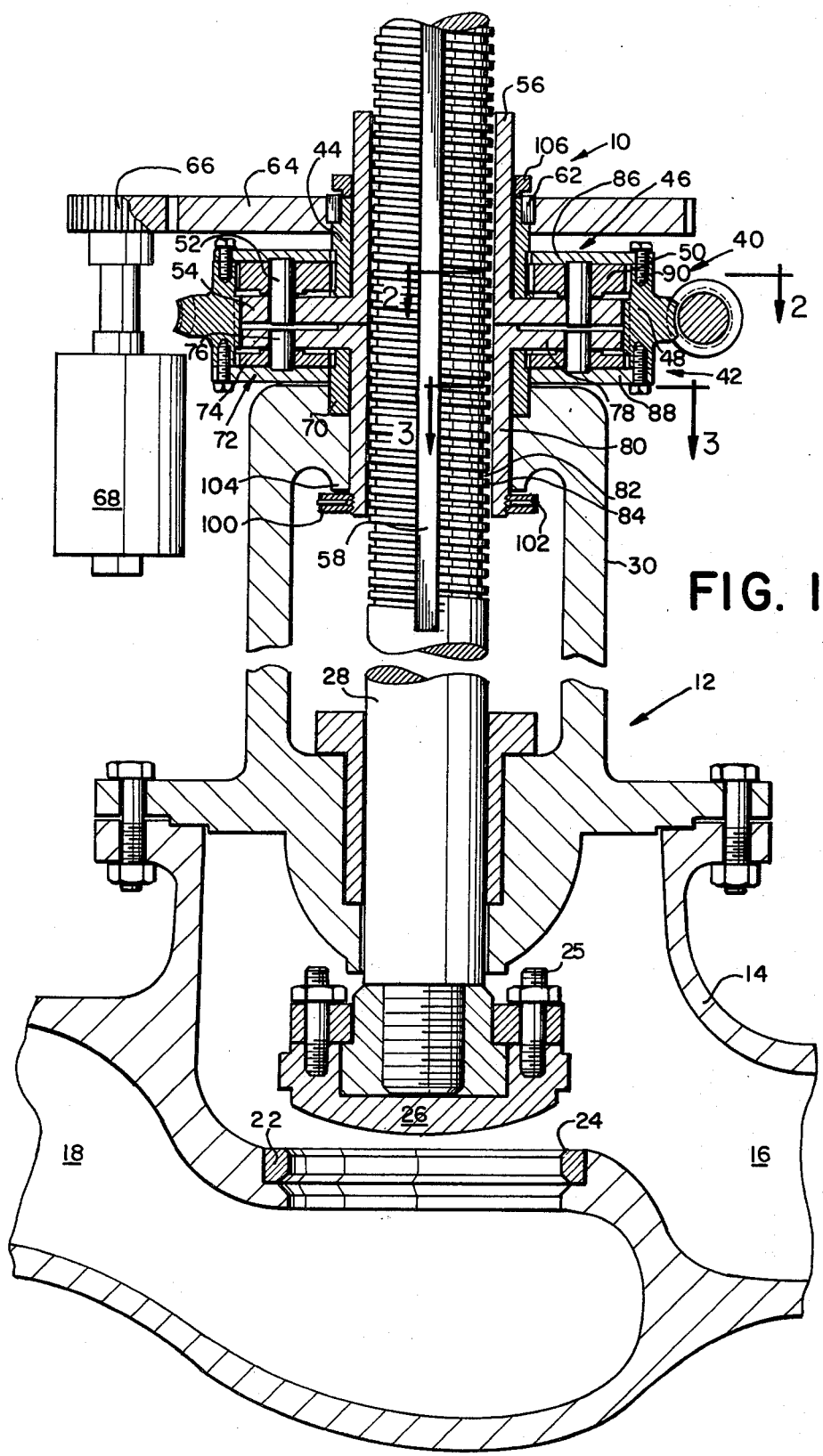
FIG. 1 is a sectional view of a preferred embodiment of the present invention.

Referring to the drawings, and particularly to FIG. 1, there is depicted in accordance with the present invention a dual mode valve actuator. The actuator, shown generally as 10, is depicted and will hereinafter be described as being employed in conjunction with a multi-turn right angle valve 12 of a type which is generally well known in the art. However, it will be appreciated that this is not intended to be a limitation upon the present invention which could be employed with other types of valves, for example, a quarter-turn valve which requires both a lifting motion and a turning motion.

The valve 12, as shown in FIG. 1, comprises a body portion 14 having an inlet port 16 and an outlet port 18. Each of the ports is surrounded by a conventional bolt flange 20 for securing suitable inlet and outlet conduits or pipes (not shown) to the valve 12.

Within the valve body 14, an annular valve seat 22 is disposed adjacent to the interior of the inlet port 16. The valve seat 22 is provided with an inwardly tapered seating surface 24 which is suited for engagement with a valve element or disc 26. Both the seating surface 24 and the disc 26 are preferably formed of a suitable hard material, for example, The disc 26 is secured to the lower end of a valve stem 28 by suitable means 25, for example the retaining plate and studs as shown on FIG. 1.

The valve 12 further includes a yoke section or yoke 30 for supporting and guiding the valve stem for axial and rotational translation. The yoke 30 is bolted to the body 14 by means of a plurality of nuts and bolts, shown generally as 32, which extend through suitable openings in abutting annular flanges 34 and 36, formed on the valve body 14 and yoke 30 respectively. Suitable sealing material (not shown) may be provided to establish a fluid tight seal between the valve body 14 and the yoke section 30. The yoke section 30 includes an annular bearing means 38 for supporting and guiding the lower portion of the valve stem 28. Additional bearings and/or packing material or the like (not shown) may also be included within the yoke section 30.

What has thus far been described is a typical multi-turn right angle valve 12. As depicted in FIG. 1, the valve 12 is in its open position whereby fluid or any other suitable medium may enter the valve body 14 through the inlet port 16 and pass out of the valve through the outlet port 18. Closing of the valve 12 is accomplished by axially advancing the disc 26 until the disc tightly engages the valve seat surface 24, thereby blocking off the flow through the inlet port 16. Axial movement of the disc 26 and thus the opening and closing of the valve 12 is accomplished by the valve stem 28.

Figure 3:
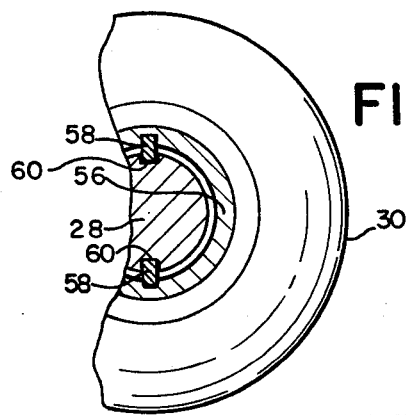
FIG. 3 is a partial sectional view of the apparatus of FIG. 1 taken along lines 3—3.

The valve stem 28 extends upwarly through the yoke section 30 to the valve actuator 10. The valve actuator is comprised of a pair of substantially identical motor-driven planetary drive assemblies 40 and 42 disposed back-to-back and utilizing a common ring gear. The first or upper planetary drive assembly 40 effects, controls or regulates rotational translation of the valve stem and includes a first sun gear 44, a first planetary drive means 46 and the common internal ring gear 48. In the present instance, the planetary drive means 46 comprises four planet gears 50, each of which is rotatably supported by a shaft 52. Each of the shafts 52 is fixedly attached to an annular flange portion 54 of a first planetary drive spider 56. As is best seen in FIG. 3, the spider 56 drivingly engages the valve stem 28 by means of a pair of stem keys 58 which, for purposes which will hereinafter become apparent, slidingly engage a pair of vertical keyways or slots 60 within the exterior surface of the valve stem 28.

To effect rotation of the valve stem, the first sun gear 44 is mounted for rotation on the hub of the spider 56, and is operatively connected, for example by suitably sized pins 62, to a concentric bull gear 64 for rotation therewith. The bull gear 64, in turn, is drivingly engaged by the output pinion 66 of a first reversible drive motor 68. As shown in FIG. 1, the drive motor 68 is an electric motor. However, it will be appreciated that the use of an electrical motor in this embodiment is not intended to be a limitation on the present invention, it being clearly understood that the invention is intended to include any other suitable type of motor, for example, a hydraulic motor.

The first planetary drive assembly operates in a conventional manner to operatively correlate the driving forces of three separate drives. Thus, when any one of its drives (sun gear 44, planetary drive means 46 or ring gear 48) is held stationary, the remaining two drives are operatively interconnected for rotation. In this manner, as will hereinafter be described, torque is transmitted from one of the three drives, for example the sun gear 44, to a second drive, for example the planetary drive means 46, when the third drive, for example the ring rear 48, is held stationary.

The second or lower planetary drive assembly 42 includes a second sun gear 70 which cooperates with the common ring gear 48 through four planet gears 74, each of which is rotatably supported by shaft 76. Each of the shafts 76 is fixedly attached to an annular flange portion 78 of a second planetary drive spider 80. The interior surface of the second spider 80 includes suitable threading 82 which engages complementary threading 84 on the upper portion of the valve stem 28, the second spider 80 thereby functioning as a stem nut.

The second sun gear 70 is mounted for rotation on the hub of the second spider 80 and, for purposes which will hereinafter become apparent, is fixedly attached to the upper end of the valve yoke 30.

The second set of planetary gears 74 engage between the second sun gear 70 and the ring gear 48. The ring gear 48 is supported by a pair of upper and lower annular support plates 86 and 88 respectively, which are suitably attached to the upper and lower surfaces of the ring gear 48 by a plurality of bolts 90. The support plates 86 and 88 encircle the first and second sun gears 44 and 70 respectively and retain the shafts 52 and 76 against axial displacement.

Means is provided to actuate the second planetary drive assembly to control axial translation of the valve stem. To this end, referring to FIG. 2, the radial exterior surface of the ring gear 84 includes an integral worm wheel 92, which engages a single-threaded worm 94 mounted upon a shaft 96 which is suitably connected through an output pinion 95 to the output shaft 97 of a second motor 98. As with the first motor, the illustration of the second motor 98 as an electrical motor is not intended to be a limitation on the present invention, it being appreciated that any other suitable type of motor, for example a hydraulic motor, could be employed.

The second planetary drive assembly operates in a conventional manner as was briefly described above with respect to the first planetary drive assembly in order to effect control or regulate axial movement of the valve stem. Thus, the second drive means controls whether the valve stem moves axially. For example, in the first mode of operation, the second drive means does not move and its non-movement permits the valve stem to move axially. In the second mode, movement of the second drive means prevents the valve stem from moving axially. However, in the second planetary drive assembly, the second sun gear 70 is the stationary drive, the torque being transmitted from the second motor 98 through the ring gear 48 to the second planetary drive means 72.

An annular lower retainer member 100 is suitably attached, for example by means of one or more pins 102, to the lower end of the radial exterior of the second spider 80. The retainer member 100 engages against an annular shoulder 104 within the top part of the valve yoke 30 in order to prevent the second spider 80 as well as the rest of the second planetary drive assembly 42 from moving upwardly relative to the valve yoke 30. A similar annular upper retainer member 106 is suitably attached to the radial exterior of the first spider 56 to prevent the first planetary drive assembly 40 from moving upwardly. The combination of the two retainer members 100 and 106 and the combination of the two support plates 86 and 88 and the ring gear 48 thus cooperate to retain the two planetary drive assemblies 40 and 42 together and in the proper position relative to the valve yoke 30.

The above-described planetary drive assemblies 40 and 42 and the two motors 68 and 98 cooperate to provide the dual mode actuator 10. Operation in the first mode is accomplished by activating the first motor 68, the output pinion 66 thereby driving the bull gear 64 and the attached first sun gear 44 into rotation. The second motor 98 remains inactivated, thereby holding the ring gear 48 stationary through the worm wheel 92 and worm 94. Since the ring gear 48 remains stationary, the rotation of the first sun gear 44 causes both the first set of planet gears 50 and spider 56 to rotate around the first sun gear 44.

The rotation of the first spider 56 which, as described above, is keyed to the valve stem 28, causes the valve stem 28 to rotate. Since the ring gear 48 remains stationary, the second planetary drive spider 80 does not turn, therefore functioning as a stationary stem nut, to convert the rotation of the stem 28 into axial or linear movement of the stem.

The direction of axial movement of the valve stem 28 depends upon the direction of stem rotation. If the rotation of the stem is clockwise, the axial movement of the stem is downward, in the direction for closing the valve. If the rotation of the stem is counterclockwise, the axial movement of the stem is upwardly, in the direction for opening the valve. The direction of rotation of the stem is determined by the direction of rotation of the first drive motor 68. In the embodiment as depicted in the Figures, counterclockwise rotation of the output shaft of the first motor 68 results, through the above-described gearing, in clockwise rotation of the valve stem 28. Clockwise rotation of the output shaft of the first motor 68 results in counterclockwise rotation of the valve stem 28. It will be appeciated, however, that a different motor arrangement or the addition of suitable suplemental gearing could result in a different relationship between the directions of rotation of the motor and the valve stem.

During the second mode of operation of the valve actuator 10, the second motor 98 is activated, thereby driving the ring gear 48 to rotate by means of the worm 94 and worm wheel 92. The first motor 68 remains inactivated, thereby holding stationary the output pinion 66, bull gear 64 and first sun gear 44. Since the first sun gear 44 remains stationary, the rotation of the ring gear 48 causes the first set of planetary gears 50 to rotate around the first sun gear 44, thereby rotating the first drive spider 56 and the valve stem 28. The rotation of the ring gear 48 also causes the second set of planetary gears 74 to rotate about the stationary second sun gear 70, thereby causing the second drive spider 80 (stem nut) to rotate.

The corresponding components on both of the planetary drive assemblies 40 and 42 are the same diameter. For example, the planet gears 50 of the first planetary drive assembly 40 are the same diameter as the planet gears 74 of the second planetary drive assembly 42. Since during the second mode of actuator operation both planetary drive assemblies 40 and 42 are driven at the same speed by the ring gear 48, both drive spiders 56 and 80 rotate in unison. The unison rotation of the two drive spiders 56 and 80 means, in effect, that both the valve stem 28 and the stem nut are rotating in unison, thereby causing the valve stem to rotate without any axial movement. The direction of rotation of the stem and stem nut is determined by the direction of rotation of the second drive motor 98.

The above-described dual mode valve actuator 10 is particularly useful in controlling many different valves in a wide variety of valve applications. The preferred embodiment, depicted in the figure, is but one such application wherein the dual mode valve actuator 10 is employed for the purpose of creating a grinding action between the valve disc 26 and the valve seat 22 for the purpose of clearing away any obstruction which may have prevented a tight positive seating or closing of the valve 12.

To create the desired valve grinding action, the actuator 10 is initially operated in the first mode, with the first drive motor 68 operating in the counterclockwise direction so that the valve stem 28 and valve disc 26 move in the valve closing (downward) direction. When the valve disc 26 rotates and is displaced axially into firm engagement with the valve seat 24, the first drive motor 68 is inactivated and the second drive motor 98 is activated, thereby operating the actuator 10 in the second mode. The rotation of the valve disc 26 against the surface of the valve seat 24 without axial displacement provides the desired grinding action to clear away valve seat obstructions. Subsequent to the grinding of the valve seat, the actuator again operates in the first mode, driving the valve disc 26 axially downwardly against the clean surface of the valve seat 24 to provide a tight seal.

Various means may be employed to control the operation of the actuator 10 in each of the two modes of operation. As will hereinafter be described in detail, the preferred embodiment depicts additional sensing and control components for automatically controlling the modes of operation of the actuator 10 to provide the desired grinding action upon closing the valve 12. However, it will be appreciated that the sensing and control components hereinafter to be described are only one example of a way in which the above-described actuator may be controlled and are not intended as a limitation upon the present invention.

Figure 2:
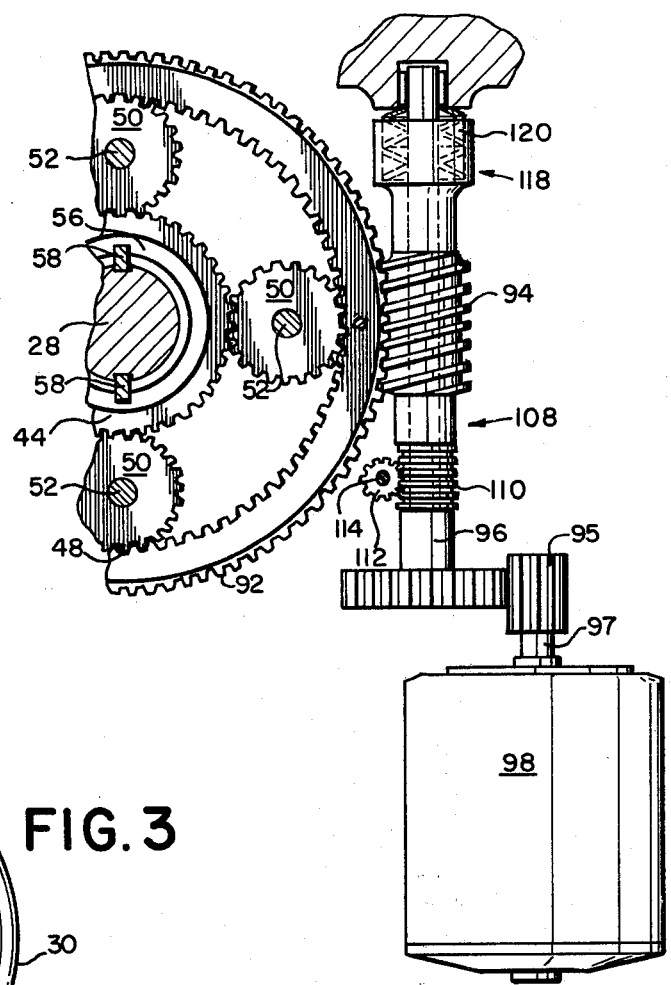
FIG. 2 is a partial sectional view of the apparatus of FIG. 1 taken along lines 2—2.

Referring now to FIG. 2, the worm shaft 96 includes a torque sensing means 108 comprised of a radial rack 110 integral therewith. The radial rack 110 is engaged by a torque pickup gear 112 which in turn is operatively coupled by means of a pickup gear shaft 114 to a switch 115 in a control means 116 (see FIG. 4). Further details of the switch 115 may be obtained by referring to my copending U.S. patent application Ser. No. 952,119, filed Oct. 17, 1978, now Pat. No. 4,261,224 and particularly FIGS. 14–16 therein.

The shaft 96 is rotatably mounted within a support housing 118 for limited axial movement which is restrained by disc springs 120 at each end (only one end being depicted in FIG. 2). The disc springs 120 are of a predetermined size so that axial movement of the shaft 96 is prevented until a predetermined torque, for example 4000 lbs., is placed upon the worm 94. Once the predetermined torque is exceeded, the shaft 96 moves axially, thereby rotating the torque pickup gear 112 and the pickup gear shaft 114.

Figure 4:
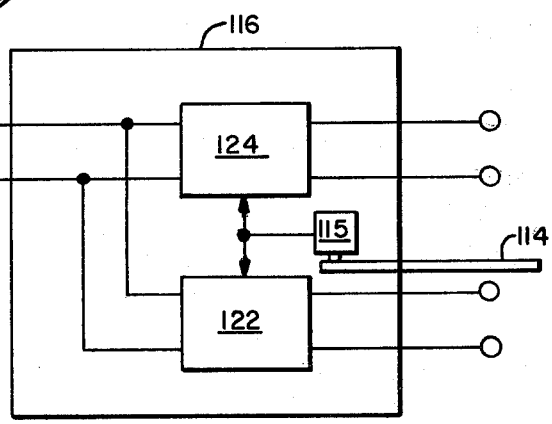
FIG. 4 is a schematic view of the control portion of the apparatus of FIG. 1.

Referring to FIG. 4, in the control means 116, the switch 115, which is operatively responsive to rotation of the pickup gear shaft 114, senses the rotational movement of the pickup gear shaft 114 and responds by deactivating the first drive motor 68 and activating the second drive motor 98. A timer means, for example a time delay relay 122, cooperates eith the torque sensing means 108 to maintain the second drive motor 98 activated for a predetermined period of time. Periodically during the perdetermined time period established by the timer means 122, the control means periodically reactivates the first drive motor 68, for example by means of the main motor relay 124, to maintain the predetermined grinding torque whenever the torque sensing means 108 indicates that the worm torque has fallen below the predetermined torque. Once the predetermined torque is reached, the control means again deactivates the first drive motor.

Once the predetermined time period set by the timer means 122 has expired, the timer means 122 deactivates the second drive motor 98 and reactivates the first drive motor 68 to close the valve. The first motor 68 is inactivated when the required disc seating torque is developed. Opening the valve resets the control means 116 to reestablish the above-described grinding operation the next time the valve is closed.

From the foregoing description, it can be seen that the present invention provides a dual mode valve actuator which is fully automated and yet remains relatively simple in design. It will be recognized by those skilled in the art that changes may be made to the above-described embodiment without departing from the broad inventive concepts of the invention. For example, the gearing arrangement could be modified so that the first drive spider 56 would serve as the stem nut and the second drive spider 80 would drive the valve stem 28 for rotation. Likewise, the controller 116 may be modified to drive the motors concurrently in opposite directions to effect axial displacement of the shaft without imparting rotational translation, by arresting movement of the keyed spider 56 while driving the stem-nut spider 80. It is understood, therefore, that this invention is not limited to the particular embodiments disclosed, but it is intended to cover all modifications, which are within the scope and spirit of the invention as defined by the appended claims.

I claim:

1. A dual mode valve actuator for automatically controlling the operation of a valve having a valve stem, at least a portion of which is threaded, and a valve yoke comprising:

a first reversible drive motor activated during a first mode of actuator operation;

a first planetary drive assembly having a first sun gear operatively coupled to the first drive motor, a first planetary drive means slidingly coupled to the valve stem to rotate the same, the first planetary drive means including at least a first planetary gear engages the first sun gear and a ring gear which engages the first planet gear;

a second drive motor operatively coupled to the ring gear, the second drive motor being activated during a second mode of valve actuator operation;

a second planetary drive assembly having a second sun gear fixedly attached to the valve yoke and a second planetary drive means engaging the threaded valve stem portion, the second planetary drive means including at least a second planetary gear which engages the second sun gear and the ring gear;

whereby during the first mode of operation, the second planetary drive assembly and the ring gear are fixed by the unactivated second motor, the first planetary drive means rotating the valve stem relative to the second planetary drive means thereby moving the valve stem axially and during the second mode of operation, the first sun gear is fixed by the unactivated first motor, both of the planetary drive means rotating in unison, thereby rotating the valve stem without axial movement thereof; the valve actuator further comprising torque sensing means for sensing the torque developed by the valve stem during the first mode of operation, the torque sensing means including control means for causing the actuator to operate in the second mode of operation by deactivating the first motor and activating the second motor when the torque sensed exceeds a predetermined torque limit.

2. A dual mode valve actuator for automatically controlling the operation of a valve having a valve stem, at least a portion of which is threaded, comprising:

a first drive motor activated during a first mode of valve actuator operation;

a first planetary drive assembly operatively coupled to the first drive motor and to the valve stem;

a second drive motor activated during a second mode of valve actuator operation, and operatively coupled to the first planetary drive assembly;

a second planetary drive assembly operatively coupled to the second drive motor and engaging the threaded portion of the valve stem;

whereby during the first mode of operation, said first planetary drive assembly is rotated relative to the second planetary drive assembly to move said valve stem axially, and during the second mode of operation, the planetary drive assemblies are driven into rotation such that the valve stem rotates without axial movement thereof; the valve actuator further comprising torque sensing means for sensing the torque developed by the valve stem during the first mode of operation, the torque sensing means including control means for causing the actuator to operate in the second mode of operation by deactivating the first motor and activating the second motor when the torque sensed exceeds a predetermined torque limit.

3. A dual mode valve actuator for automatically controlling the operation of a valve having a valve stem, comprising:

a first drive motor activated during a first mode of valve actuator operation;

a first planetary drive assembly operatively coupled to the first drive motor and to the valve stem;

a second drive motor activated during second mode of valve actuator operation, and operatively coupled to the first planetary drive assembly;

a second planetary drive assembly operatively coupled to the second drive motor and to the valve stem;

whereby during the first mode of operation, said valve stem is driven by said first planetary drive assembly to move axially, and during the second mode of operation, the two planetary drive assemblies are driven into rotation to rotate the valve stem without axial movement thereof; the valve actuator further comprising torque sensing means for sensing the torque developed by the valve stem during the first mode of operation, the torque sensing means including control means for causing the actuator to operate in the second mode of operation by deactivating the first motor and activating the second motor when the torque sensed exceeds a predetermined torque limit.

4. The valve actuator as recited in claim 1, 2 or 3 further comprising timer means cooperating with the torque sensing means for maintaining the actuator in the second mode of operation for a predetermined time period.

5. The valve actuator as recited in claim 4 wherein the control means periodically reactivates the first motor whenever the valve stem torque falls below the predetermined torque limit during the predetermined time period.

6. The valve actuator as recited in claim 5, the valve further including a valve disc fixedly attached to the valve stem and a valve seat, wherein the valve stem torque is the reaction torque developed upon the closing of the valve by the engagement of the valve disc with the valve seat, the second mode of operation grinding the valve seat to remove obstructions accumulated thereon.

7. The valve actuator as recited in claim 4 wherein the timer means deactivates the second motor and reactivates thed first motor after the predetermined time period has elasped.

8. The valve actuator as recited in claim 1 wherein the first motor includes an output pinion connected to the shaft thereof and the first planetary drive assembly

AUTOMATED DUAL MODE VALVE ACTUATOR

FIELD OF THE INVENTION

This invention relates generally to valve actuators and, more particularly, to a valve actuator which automatically provides for both rotational and axial translational movement of a valve stem.

DESCRIPTION OF THE PRIOR ART

In many applications it is desirable to have the ability to move the stem of a valve in two ways, axially and rotationally. For example, in some industrial applications it is desirable when closing the valve, to first move the valve stem axially so that the valve disc contacts the valve seat and then to rotate the valve stem so the valve disc grinds against the seat to remove any buildup of deposited material which may have otherwise acted to prevent a complete closing of the valve.

One such prior art valve is described in U.S. Pat. No. 2,996,075 to Deimer et al. The Deimer et al patent discloses a valve which may be opened or closed, without rotation of the valve stem, by rotating a threaded yoke bushing surrounding and engaging the valve stem. The rotation of the yoke bushing is accomplished through suitable gearing keyed to the yoke bushing, utilizing either a manual or power wrench. Rotation of the yoke bushing causes the valve stem to move axially (upwardly or downwardly), thereby engaging or disengaging the valve seat and the valve disc. When the valve seat is to be ground, the valve disc is lowered into engagement with the seat and a jam nut is tightened so that the yoke bushing and the valve stem are locked together and rotate in unison. The subsequent rotation of a suitable handle on the yoke bushing (as described above) rotates the valve stem (without axial movement) to grind the valve disc against the valve seat.

The Deimer et al valve operates effectively in some applications, however, in many applications, the excessive physical effort required to accomplish the grinding and proper seating of the valve makes it unsuitable. Additionally, the design of the Deimer et al valve makes automation of the grinding function complex and expensive.

The present invention overcomes the deficiencies of the prior art by providing an automated dual mode valve actuator which provides for both rotational and axial movement of a valve stem.

SUMMARY OF THE INVENTION

Briefly stated, the present invention provides a dual mode valve actuator for controlling the operation of a valve having a valve stem at least partially threaded to provide for both rotational and axial movement of the valve stem. The apparatus comprises a first drive motor which is activated during the first mode of valve actuator operation. A first planetary drive assembly operatively couples the first drive motor to the valve stem. A second drive motor, which is activated during the second mode of actuator operation, is operatively coupled to the first planetary drive assembly and to a second planetary drive assembly. The second planetary drive assembly threadingly engages the valve stem. During the first mode of operation, the valve stem is driven by the first planetary drive assembly to rotate relative to the second drive assembly, thereby moving the valve stem in an axial direction. During the second mode of operation, both planetary drive assemblies are driven to rotate in unison, thereby rotating the valve stem without axial movement thereof. Control means is provided for activating the deactivating the two motors.

BRIEF DESCRIPTION OF THE DRAWINGS

The foregoing summary as well as the following detailed description of a preferred embodiment of the present invention will be better understood when read in conjunction with the accompanying drawings, in which:

FIG. 1 is a sectional view of a preferred embodiment of the present invention;

FIG. 2 is a partial sectional view of the apparatus of FIG. 1 taken along lines 2—2;

FIG. 3 is a partial sectional view of the apparatus of FIG. 1 taken along lines 3—3; and FIG. 4 is a schematic view of the control portion of the apparatus of FIG. 1.

DESCRIPTION OF A PREFERRED EMBODIMENT

Referring to the drawings, and particularly to FIG. 1, there is depicted in accordance with the present invention a dual mode valve actuator. The actuator, shown generally as 10, is depicted and will hereinafter be described as being employed in conjunction with a multi-turn right angle valve 12 of a type which is generally well known in the art. However, it will be appreciated that this is not intended to be a limitation upon the present invention which could be employed with other types of valves, for example, a quarter-turn valve which requires both a lifting motion and a turning motion.

The valve 12, as shown in FIG. 1, comprises a body portion 14 having an inlet port 16 and an outlet port 18. Each of the ports is surrounded by a conventional bolt flange 20 for securing suitable inlet and outlet conduits or pipes (not shown) to the valve 12.

Within the valve body 14, an annular valve seat 22 is disposed adjacent to the interior of the inlet port 16. The valve seat 22 is provided with an inwardly tapered seating surface 24 which is suited for engagement with a valve element or disc 26. Both the seating surface 24 and the disc 26 are preferably formed of a suitable hard material, for example, The disc 26 is secured to the lower end of a valve stem 28 by suitable means 25, for example the retaining plate and studs as shown on FIG. 1.

The valve 12 further includes a yoke section or yoke 30 for supporting and guiding the valve stem for axial and rotational translation. The yoke 30 is bolted to the body 14 by means of a plurality of nuts and bolts, shown generally as 32, which extend through suitable openings in abutting annular flanges 34 and 36, formed on the valve body 14 and yoke 30 respectively. Suitable sealing material (not shown) may be provided to establish a fluid tight seal between the valve body 14 and the yoke section 30. The yoke section 30 includes an annular bearing means 38 for supporting and guiding the lower portion of the valve stem 28. Additional bearings and/or packing material or the like (not shown) may also be included within the yoke section 30.

What has thus far been described is a typical multi-turn right angle valve 12. As depicted in FIG. 1, the valve 12 is in its open position whereby fluid or any other suitable medium may enter the valve body 14 through the inlet port 16 and pass out of the valve through the outlet port 18. Closing of the valve 12 is

UNITED STATES PATENT AND TRADEMARK OFFICE
CERTIFICATE OF CORRECTION

PATENT NO. : 4,346,728

DATED : August 31, 1982

INVENTOR(S) : Harry E. Sulzer

It is certified that error appears in the above-identified patent and that said Letters Patent are hereby corrected as shown below:

```
Column 2, line 3,     change "the" (first occurrence) to --and--;
Column 2, line 28,    delete "right angle";
Column 2, lines 34-38, delete in their entirety;
Column 2, line 45,    after "material" delete ", for example," and
                      insert a period (.);
Column 2, lines 49-63, delete in their entirety;
Column 2, line 64,    delete "turn right angle valve 12.";
Column 3, line 7,     change "upwarly" to --upwardly--;
Column 4, line 8,     "84" should be --48--;
Column 5, line 10,    "depicted" should be --shown--;
Column 5, line 17,    change "suplemental" to --supplemental--;
Column 5, line 51,    delete "preferred";
Column 5, line 52,    change "depicted" to --shown--;
Column 5, line 52,    change "figure" to --figures--;
Column 6, line 11,    delete "preferred";
Column 6, line 11,    delete "depicts" and insert --shown in the
                      figures includes--;
Column 6, line 46,    change "eith" to --with--;
Column 6, line 49,    change "perdetermined" to
                      --predetermined--;
Claim 7, line 3,      change "thed" to --the--.
```

Signed and Sealed this

Fifteenth Day of March 1983

[SEAL]

Attest:

GERALD J. MOSSINGHOFF

Attesting Officer

Commissioner of Patents and Trademarks